United States Patent

Guzik et al.

[11] Patent Number: 6,006,614
[45] Date of Patent: Dec. 28, 1999

[54] APPARATUS AND METHOD FOR IMPROVING DYNAMIC CHARACTERISTICS OF A FINE-POSITIONING MECHANISM IN A MAGNETIC HEAD/DISK TESTER

[75] Inventors: Nahum Guzik, Palo Alto; Ufuk Karaaslan, San Jose; Cem Kilicci, San Francisco, all of Calif.

[73] Assignee: Guzik Technical Enterprises, San Jose, Calif.

[21] Appl. No.: 09/044,301

[22] Filed: Mar. 19, 1998

[51] Int. Cl.[6] .................................................. G01N 17/00
[52] U.S. Cl. ........................................ 73/865.6; 324/212
[58] Field of Search ..................................... 73/105, 865.8, 73/866.5, 865.6; 324/210, 212; 360/31, 106

[56] References Cited

U.S. PATENT DOCUMENTS

| | | | |
|---|---|---|---|
| 4,902,971 | 2/1990 | Guzik et al. | 324/212 |
| 5,216,559 | 6/1993 | Springer . | |
| 5,305,294 | 4/1994 | Kime et al. . | |
| 5,808,435 | 9/1998 | Mager | 318/593 |

OTHER PUBLICATIONS

Thomas et al., "Circuits and Signals: An Intorduction To Linear and Interface Circuits", John Wiley & Sons, Copyright 1984.

Primary Examiner—Robert Raevis
Attorney, Agent, or Firm—Lappin & Kusmer LLP

[57] ABSTRACT

An improved fine positioning mechanism in a magnetic head/disk tester includes a primary position actuator and a primary body that supports a read/write head to be tested, and an auxiliary body and auxiliary actuator. Both actuators operate contemporaneously and in mutually opposite directions. The masses of both bodies and the stiffnesses of both actuators are selected so that a ratio of the stiffness of the actuator to the mass of the body in the primary system is equal to a ratio of the stiffness of the actuator to the mass in the auxiliary system. In addition, the masses of both bodies and the expansion coefficients of both actuators are selected so that a product of the mass of the body with the expansion coefficient of the actuator in the primary system is equal to a product of the mass of the body with the expansion coefficient of the actuator in the auxiliary system. In this manner, forces operating on both bodies are equal in magnitude and opposite in direction and therefore counterbalance each other when the same control voltage is applied to both actuators. This, in turn, eliminates or reduces vibrations in the slide supporting the actuators and therefore the head-positioning settling time is significantly reduced.

29 Claims, 8 Drawing Sheets

APPARATUS AND METHOD FOR IMPROVING DYNAMIC CHARACTERISTICS OF A FINE-POSITIONING MECHANISM IN A MAGNETIC HEAD/DISK TESTER

FIELD OF THE INVENTION

The present invention relates to magnetic head and disk testers; in particular, to an apparatus and a method for improving dynamic characteristics of a fine-positioning mechanism in a magnetic head/disk tester.

BACKGROUND OF THE INVENTION

A head/disk tester is an instrument that is used for testing the characteristics of magnetic heads and disks such as a signal-to-noise ratio, track profile, etc. The tester should simulate those motions of the head with respect to the disk that occur in an actual hard disk drive during operation. Each tester consists of two components; a mechanical component, commonly referred to as a spinstand, that performs movements of the head with respect to the disk, and an electronic component that is responsible for measurement, calculation, and analysis of the measured signal. Test results depend on the accuracy of both components.

A typical prior art spinstand for a head and disk tester is described in U.S. Pat. No. 4,902,971, issued in 1990 and incorporated herein by reference. It includes a stationary base plate which supports a stepper motor. The stepper motor includes an output shaft which is connected to a coaxially-arranged lead screw. The lead screw rotates in bearings and engages a nut which is rigidly fixed to a linear slide. In this manner, motor rotation is converted into linear movement of the slide. The slide supports an arm upon which a magnetic head is rigidly mounted. The arm can be rotated relative to the slide so as to provide angular movement of the head. In this manner, the tester provides a range of radial movements of the head and variations in skew angle, where skew angle is the angle between the longitudinal axis of the magnetic head and a line extending tangentially from a concentric track of the magnetic disk.

As the density of magnetic recording increases, additional information tracks are compressed into a given disk area. The decrease in track size heightens the demand for improved accuracy in head positioning. This challenge is compounded by a desire for faster operation speed, and low cost for tester manufacture and tester operation.

Attempts have been made to improve accuracy in magnetic head positioning by providing a head and disk tester with separate coarse and fine-positioning mechanisms. Such a tester is disclosed in pending U.S. patent application Ser. No. 08/813,345 filed on Mar. 7, 1997 by the same applicant and incorporated herein by reference. In this tester, the coarse-positioning mechanism is the same as the conventional positioning mechanism described above. A fragmental side view of the fine-positioning mechanism is shown in Prior Art FIG. 1. This embodiment includes a slide 12 supportive of a nut 14 adapted to engage with lead screw 10, and a deformable body 16, e.g., in the form of a deformable parallelepiped. The lower surface 17 of deformable body 16 is rigidly attached to the aforementioned slide 12. The upper surface 19 of deformable body 16 supports a magnetic read/write head H. A piezo actuator 20 is placed between a first side of the deformable body 16 and a post 18 stationary with respect to slide 12. Piezo actuator 20 is preloaded between post 18 and deformable body by a set of springs 24 which urge the deformable body toward the piezo actuator 16 and the post 18.

The positioning operation consists of two steps. Coarse positioning is achieved by inducing rotating lead screw 10 by stepper motor (not shown), causing linear movement of slide 12, together with deformable body 16 and magnetic head H to the vicinity of a predetermined position. Upon completion of coarse positioning, a fine positioning mechanism is activated by piezo actuator 20 to position deformable body 16 and magnetic read/write head H within the specified accuracy of the tester. The time required for placement of the magnetic read/write head H within a specified tolerance is referred to as the settling time of the tester. Efficient testing procedures require that settling time be as short as possible.

Many critical magnetic head and disk tests, for example measurement of the read-write offset of magneto-resistive (MR) read/write heads, or track profile measurement, require the magnetic read/write head to be repeatedly repositioned at different small positional offsets from its original location. In most cases, these small changes in the position of the head can be achieved using the fine positioning mechanism only, without activation of the coarse positioner. Since it is desirable to minimize test duration, each fine positioning operation should be performed as expeditiously as possible.

It is important to note, however, that lead screw 10, slide 12, piezo actuator 20, post 18, deformable body 16, etc., together form a complex mechanical system having natural resonance frequencies. If the stepper motor of the coarse positioner moves slide 12 too quickly during coarse positioning, or if piezo actuator 20 is driven too fast during fine positioning, the time for head positioning decreases, but excessive oscillations arise in this system, resulting in an increase in settling time.

An optimal response time of the piezo actuator corresponds to the minimum settling time for a given positioning accuracy. This response time is a function of the mass and stiffness of slide 12, the mass of deformable body 16, the stiffness of piezo actuator 20, the stiffness of the post 18, the stiffness of lead-screw nut 14, and the stiffness of the lead screw support unit (not shown). The smaller the respective masses, and the higher the stiffnesses, the faster piezo actuator 20 can be driven to achieve the minimum settling time.

The mass of the slide 12 cannot be decreased below some minimum because certain baseline mechanical configurations are required in order to mount lead-screw nut 14 and piezo actuator 20 on the slide 12 properly, while maintaining slide 12 stiffness. Likewise, the mass of the deformable body 16 can be decreased only to some minimum since certain mechanical configurations are required in order to mount the magnetic read/write head H properly on the deformable body 16. Due to limitations including part size, material stiffness and availability of commercial parts of higher stiffness, increasing stiffness beyond a certain amount is not possible, either. In other words, the conventional fine-positioning mechanisms of head/disk testers have inherent dynamic characteristics that limit further increase in testing speed.

The prior art fine positioning system described above is therefore subject to vibrations, because the reaction R from the force F applied by piezo actuator 20 to deformable body 16 will be transmitted through post 18, slide 12, and nut 14 to lead screw 10. At each positioning operation, the aforementioned system will oscillate, and therefore, measurement cannot be initiated until the system is settled down to a substantially stable condition.

OBJECTS AND SUMMARY OF THE INVENTION

It is an object of the present invention to provide a magnetic disk/head tester and a method for improving the dynamic characteristics of a fine-positioning mechanism in the tester.

Another object of the invention is to provide the aforementioned tester and a method for reducing or eliminating vibrations in the system formed by the lead screw, nut, slide, piezo actuator, and by deformable body of a spinstand with separate coarse and fine-positioning mechanisms.

Still another object of the invention is to provide the aforementioned tester and method that quicken positioning of the magnetic head during test.

A further object of the invention is to provide the aforementioned tester and a method that allow the use of heavy test measurement mechanisms without a detrimental effect on accuracy and speed of testing.

More specifically, the invention is based on the principle that, along with a primary actuator and a body that supports a read/write head to be tested, the spinstand is provided with an auxiliary body and an auxiliary actuator. Both actuators operate simultaneously and in mutually opposite directions.

The masses of both bodies and the stiffnesses of the actuators are selected so that the ratio of the stiffness of the actuator to the mass of the deformable body in the primary system is equal to the ratio of the stiffness of the actuator to the mass of the deformable body in the auxiliary system. Furthermore, the masses of both bodies and the expansion coefficients of the actuators (the change in the length of the actuator per unit voltage applied to the actuator) are selected so that the product of the mass of the deformable body with the expansion coefficient of the actuator in the main system is equal to the product of the mass of the deformable body with the expansion coefficient of the actuator in the auxiliary system. With this selection of the masses of both bodies, the stiffnesses and the expansion coefficients of both actuators, forces acting on both bodies are equal in magnitude and opposite in direction and therefore counterbalance each other when the same control voltage is applied to both actuators. This protects the lead screw from the effect of vibrations in the fine-positioning mechanism, minimizing system settling time.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The invention will now be further described in detail with reference to preferred embodiments of a tester having a dynamically-improved fine-positioning mechanism.

Figure 2:
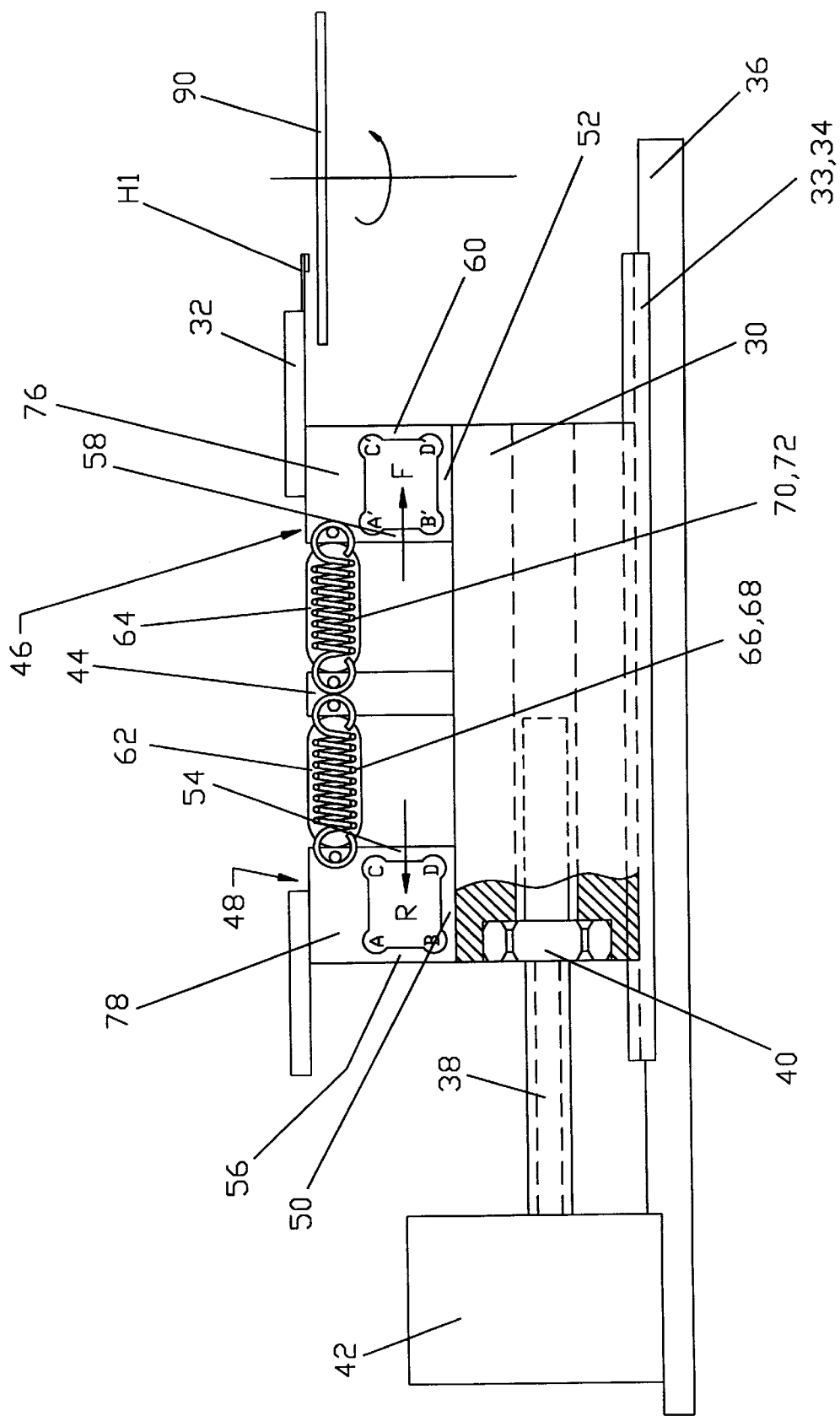
FIG. 2 is a schematic side view of a fine-positioning mechanism including two mutually opposite and counterbalancing systems, each consisting of a piezo actuator and a deformable body, in accordance with the present invention.
Figure 3:
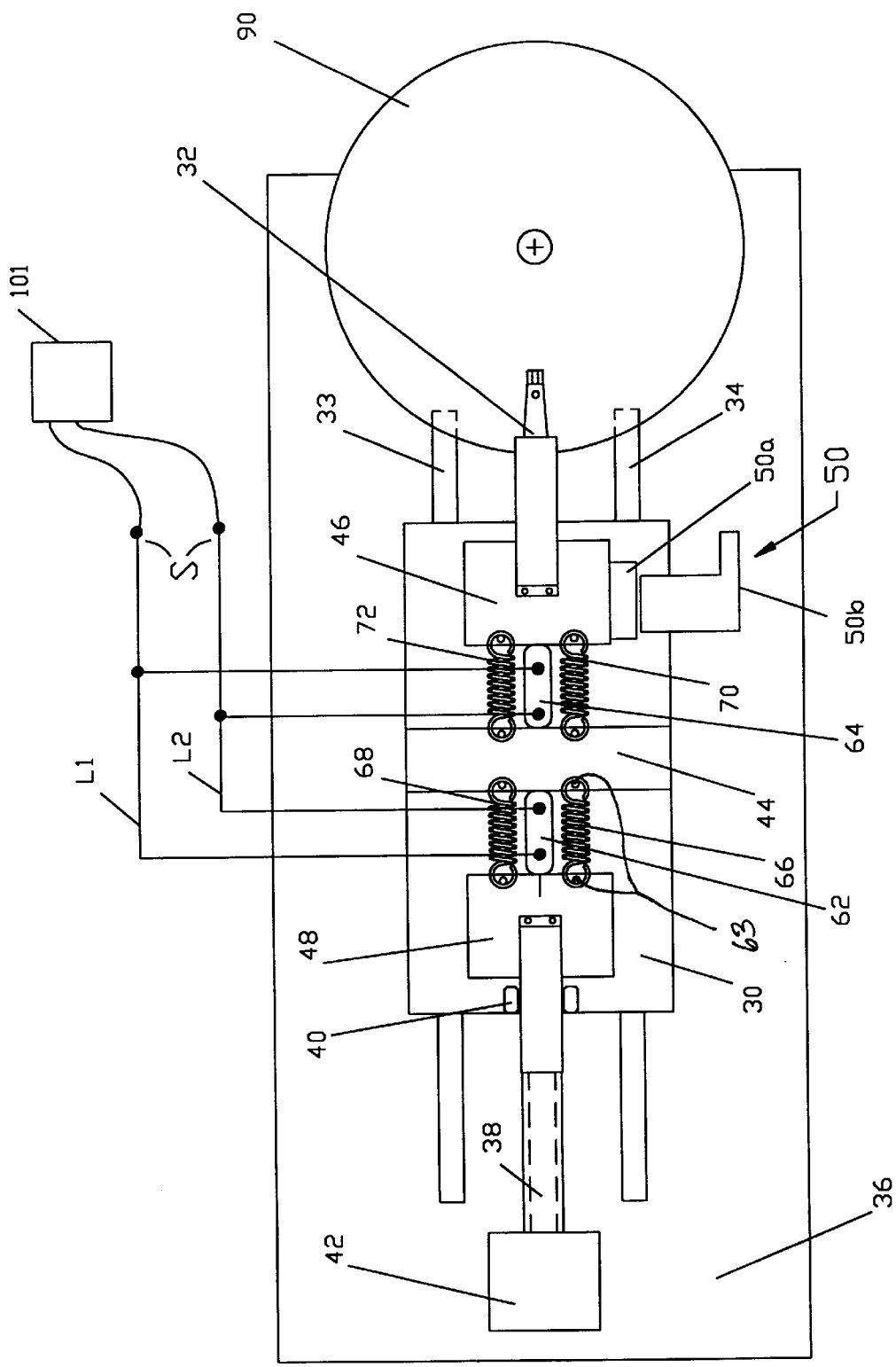
FIG. 3 is a top view of the apparatus of FIG. 2.

FIG. 2 is a schematic fragmental side view of a tester according to a preferred embodiment of the invention with two mutually opposite and counterbalancing systems, each consisting of an actuator such as a piezo actuator 62, 64 and a deformable body 46, 48. FIG. 3 is a top view of the apparatus of FIG. 2.

As shown in FIGS. 2 and 3, the tester includes a slide 30 that is guided along guide rails 33, 34 supported by a base plate 36. As in a conventional tester, slide 30 is moved along guides 33, 34 by means of a lead screw 38 that engages a nut 40 secured in slide 30 and is driven into rotation by a stepper motor 42 installed on the base plate 36. The conventional spindle and spindle drive mechanism for rotating a magnetic disk 90 are not shown. The slide 30 includes a vertical post 44 that is rigidly attached to or is made integrally with slide 30 and extends upward from the upper surface of slide 30 in an intermediate position thereof.

Figure 1:
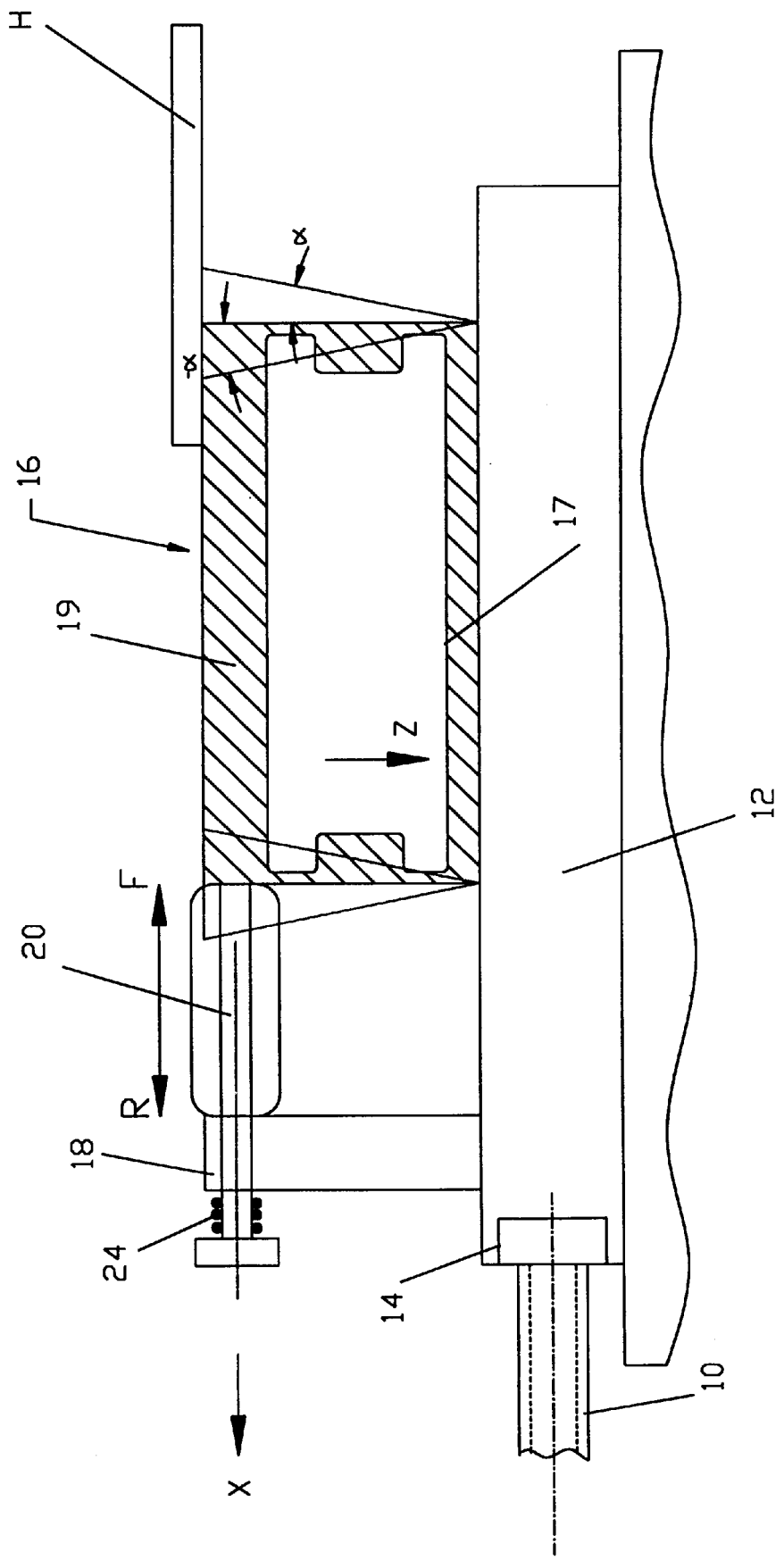
FIG. 1 is a schematic fragmental side view of a prior fine-positioning mechanism, including a deformable body.

Primary and auxiliary deformable bodies 46, 48 respectively, are located on each side of post 44. Each deformable body 46, 48 may have a construction similar to that shown in FIG. 1 in connection with the prior art. The bodies 46, 48 are in the form of a hollow parallelepiped having truss walls 54, 56 and 58, 60, respectively. These truss walls include portions A, B, C, D and A', B', C', and D', respectively, of lower stiffness than the remaining parts of respective walls. Lower portions 50, 52 of each deformable body 46, 48 are rigidly attached to the upper surface of slide 30. Upper portions 76, 78 of each deformable body are supported in the vertical direction by the truss walls 54, 56 and 58, 60 respectively. The lower-stiffness portions impart deformability to the parallelepiped so that it can deform under the effect of external forces applied to the upper portions 76, 78 by piezo actuators 62, 64, causing the upper portions to move in a longitudinal direction perpendicular to the truss walls 54, 56 and 58, 60 respectively, and parallel to the lower portions 50 and 52 respectively. The actuators are prestressed by springs 66, 68 and 70, 72, mounted between the upper portions 76, 78 of deformable bodies 46, 48 and facing surfaces of post 44.

The working ends of piezo actuators 62, 64 are urged by forces of springs 66, 68 and 70, 72 toward the respective deformable bodies 48, 46. When the lengths of piezo actuators 62, 64 are changed upon applying voltage S (see FIG. 3), deformable bodies 48, 46 operate as parallel-link mechanisms that perform small linear displacements.

Each piezo actuator is a standard piezoelectric device that changes its linear dimension in response to the voltage applied to its input. A primary characteristic of a piezo actuator is the expansion coefficient $\alpha$—the change in the actuator length per applied unit voltage. An example of commercially available piezo actuator is a device sold under the trademark PZT-5H produced by Morgan Matroc Inc., Ohio, USA.

The above mentioned configuration makes it possible to provide a device with high stiffness in the vertical direction, and with high positioning accuracy in the direction of the read/write head displacement. The microscopic displacement that is caused in the deformable body by piezo actuator 64 is on the order of a maximum of 25 μm.

Deformable body 46 supports on a surface of its top portion 76 an arm 32 which, in turn, supports a read/write magnetic head H1 that is to be tested. The head H1 is appropriately secured in place in a manner known in the art. Deformable body 46, piezo actuator 64, and springs 70, 72 form a primary, or main, fine-positioning system, while deformable body 48, piezo actuator 62, and springs 66, 68 form an auxiliary or counterbalancing system. Actuators 62, 64 of both systems operate simultaneously and in mutually opposite directions. In a preferred embodiment, the masses and stiffnesses of both actuator-deformable body systems are selected so that a ratio of the stiffness of the actuator to the mass of the deformable body in the primary system is substantially equal to a ratio of the stiffness of the actuator to the mass in the auxiliary system. In addition, the masses of both systems and the expansion coefficients of both actuators are selected so that a product of the mass of the deformable body with the expansion coefficient of the actuator in the primary system is substantially equal to a product of the mass of the deformable body with the expansion coefficient of the actuator in the auxiliary system. With proper selection of the masses of both bodies, and the stiffnesses and expansion coefficients of both actuators, forces acting on both deformable bodies are equal in magnitude and opposite in direction and therefore counterbalance each other. This results in substantial elimination of vibrations at post 44 which, in turn, protects the lead screw from effect of vibrations in the fine-positioning mechanism; thereby reducing the settling time of the read/write head.

The aforementioned ratios $(k_1/m_1)$ and $(k_2/m_2)$ (where $m_1$ and $m_2$ are masses of deformable bodies 46 and 48, respectively, and $k_1$ and $k_2$ are stiffnesses of actuators 64 and 62, respectively) define oscillation frequencies of both systems. The aforementioned products $(m_1 \times \alpha_1)$ and $(m_2 \times \alpha_2)$ (where $\alpha_1$ and $\alpha_2$ are expansion coefficients of actuators 64 and 62, respectively) define the forces that will be applied to deformable bodies 46 and 48, respectively, which are transmitted to post 44 as reaction forces. When the ratios and products are equal, the frequencies and forces of the mechanical system are likewise equal. Therefore, the net force applied to post 44 is negligible, or zero, and vibrations at post 44 are eliminated. In this manner, the lead screw 38 is protected from the effect of vibrations in the fine-positioning mechanism, and the settling time of the positioning system is reduced.

The deformable bodies and piezo actuators need not be identical. The primary considerations for improving the dynamic characteristics of the fine-positioning system are, as stated above, $(k_1/m_1)=(k_2/m_2)$ and $(m_1 \times \alpha_1)=(m_2 \times \alpha_2)$. For example, one deformable body may be manufactured from aluminum and another from brass and the piezo actuators may be of different size, or make.

Movements of the deformable body 46 are preferably measured by an optical linear encoder 50. This instrument consists of a moveable portion 50a, referred to in the art as a linear glass scale, that is rigidly attached to the side wall of the deformable body 46, and a stationary portion 50b that comprises an optical sensor fixed to base plate 36. A signal generated by sensor 50b corresponds to movements of the upper portion 76 of deformable body 46 representing the sum of the movement of slide 30 with respect to the base plate 36 and the deformation of the deformable body 46 along the same direction as the movement of slide 30.

Optical linear encoder 50 is a standard device (Model LIP401R), produced, for example, by Heidenhain Corporation, Schaumburg, Ill., USA. This instrument can measure distances on the order of micrometers and interpolates its output signal into a digital signal by means of an interpolator (not shown) attached to the instrument.

As shown in FIG. 3, in a preferred embodiment, both piezo actuators 62, 64 are electrically connected in parallel by lines L1, and L2 to a voltage source S. In this manner, the primary and auxiliary systems are activated simultaneously and operate in synchronism.

In FIGS. 2 and 3, springs 66, 68 and 70, 72 and the mechanisms of their attachment, for example pins 63, are shown schematically. This construction is shown in more detail in FIG. 5, which is a partially sectional view illustrating a prestressed attachment of one of piezo actuators, e.g., piezo actuator 64, with the use of springs 70, 72. The second piezo actuator 62 may have a similar attachment. An alternative construction with similar functionality is shown in FIG. 4.

Figure 4:
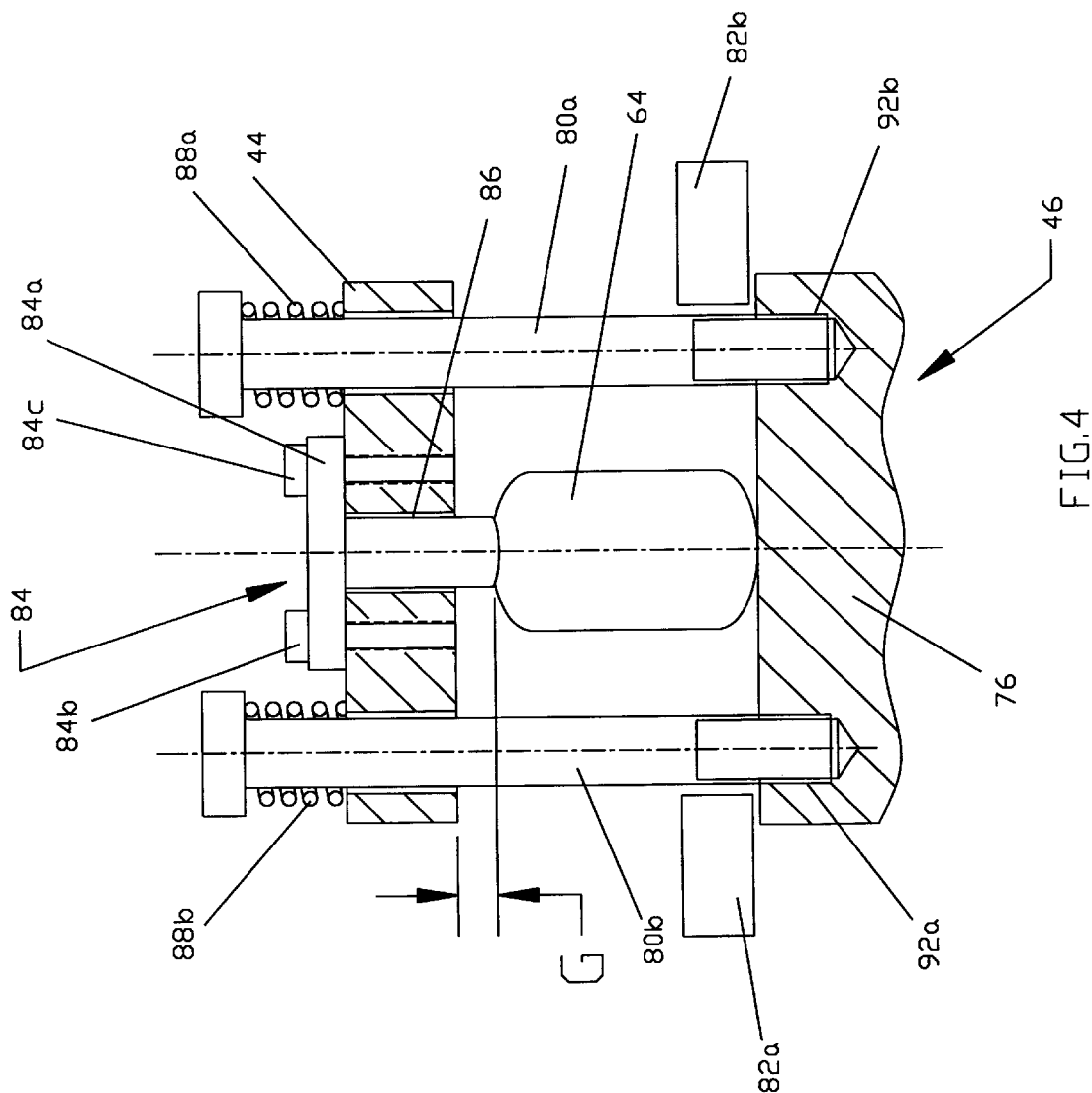
FIG. 4 is a partially sectional view illustrating a mechanism for prestressed attachment of a piezo actuator with the use of springs in compression.

As shown in FIG. 4, piezo actuator 64 is urged toward the top portion 76 (see FIG. 2) of deformable body 46 and is clamped in its working position between pusher 84 and deformable body 46 by means of springs 88a, 88b that operate under compression between shoulderbolts 80a, 80b and post 44. Pusher 84 is inserted into an opening 86 in post 44 and is attached to post 44 by means of bolts 84b, 84c which are screwed through flange 84a of pusher 84 and into deformable body 46. Shoulderbolts 80a, 80b are threaded into openings 92a, 92b inside the top portion 76 of deformable body 46 and operate to pull the top portion 76 of the deformable body 46 toward the post 44, and therefore, clamp piezo actuator 64 in position.

When the piezo actuator 64 increases in length under applied voltage S, and moves the top portion 76 away from the post 44, the springs 88a, 88b operate to pull the shoulderbolts 80a, 80b toward the post 44, thereby ensuring contact between the pusher 84 of post 44, the piezo actuator 64 and top portion 76 of deformable body 46. Similarly, when the applied voltage S is decreased and the piezo actuator 64 decreases in length, the springs 88a, 88b, in cooperation with shoulderbolts 80a, 80b, pull the top portion 76 of the deformable body 46 toward post 44, ensuring accurate control of the position of top portion 76 by means of applied voltage S to piezo actuator 64.

The front end of pusher 84 protrudes from the surface of post 44 toward piezo actuator 64, so that in a clamped state of the piezo actuator 64, a small distance G remains between the post 44 and the mating end face of piezo actuator 64. This facilitates removal and replacement of the piezo actuator 64. In order to remove piezo actuator 64, bolts 84b, 84c can be loosened and pusher 84 shifted away from piezo actuator 64.

In order to protect deformable body 46 from extreme deformations in the direction toward post 44, when piezo actuator 64 is removed, the device is provided with stops 82a and 82b which are rigidly attached to slide 30 (the attachment means of stops are not shown).

Figure 5:
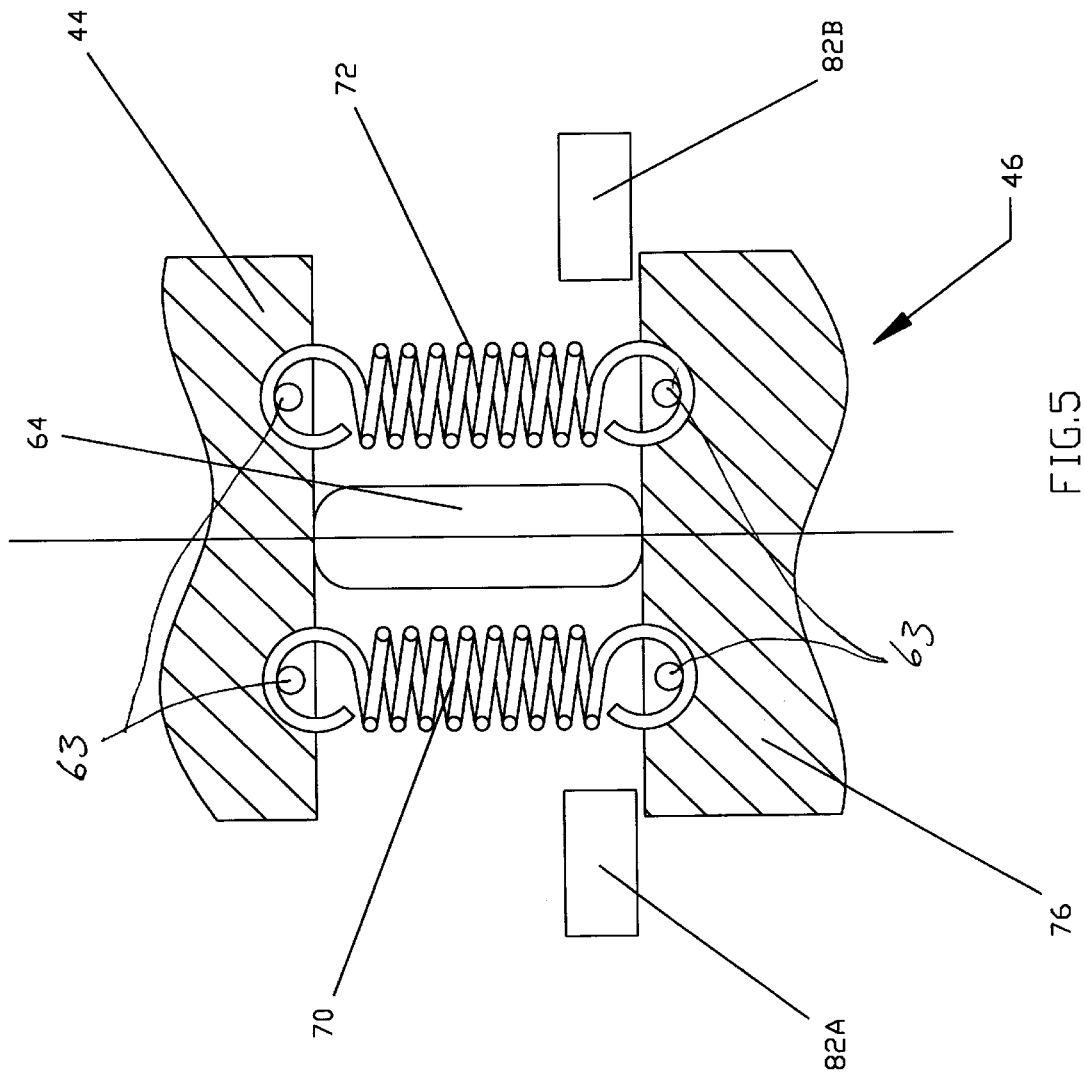
FIG. 5 is a partially sectional view illustrating a mechanism for prestressed attachment of a piezo actuator with the use of springs in tension.

Another configuration in which the piezo actuator 64 is prestressed using springs 70, 72 operating under tension is shown in FIG. 5. The springs 70, 72, mounted between pins 63, operate to urge the top portion 76 of deformable body 46 toward post 44. When the piezo actuator 64 is placed between the post 44 and the deformable body 46, its length, which varies under applied voltage S, controls the amount of displacement of the top portion 76 of deformable body 46.

The springs 70 and 72 ensure contact between the piezo actuator 64, post 44, and top portion 76. Furthermore, by pulling the top portion 76 toward the post 44, the springs 70 and 72 ensure that the displacement of the top portion 76 is controlled by the change in length of the piezo actuator 64 only. Similar to the arrangement of FIG. 4, in order to protect the deformable body 46 from extreme deformation in the direction toward post 44, when piezo actuator 64 is removed, the device is provided with stops 82a and 82b which are rigidly attached to slide 30 (the attachment means of stops are not shown).

The operation of the fine positioning mechanism will now be described with reference to FIGS. 2 and 3. Upon completion of coarse positioning by means of lead screw 38 driven from stepper motor 42 and upon completion of placement of slide 30 into an appropriate position, such that read/write head H1 is stopped within a certain range from the final target position, the fine positioning mechanism of the invention is activated by applying an electric control voltage S at controller 101 to both piezo actuators 62, 64 that preferably are connected in parallel and therefore operate simultaneously. As mentioned above, actuators 62, 64 operate to move the deformable bodies 48, 46 in opposite directions.

Under the effect of the electrical control voltage S, each actuator 62, 64 changes its linear dimension in proportion to the level of the applied voltages. When the actuators 62, 64 change in linear dimension, variation in their lengths cause displacement of the upper portions 76, 78 of the respective deformable bodies 46, 48. Because of the presence of weakened portions A, B, C, D and A', B', C', D', bodies 48, 46 will deform as parallel-link mechanisms, i.e., their upper portions 76, 78 will be shifted with respect to the lower portions 50, 52 in the direction of deformation of piezo actuators 62, 64 and strictly parallel to themselves and thus to the lower portions.

As a result of expansions and contractions of piezo actuator 46, the arm 32 supporting read/write head H1 is shifted with respect to magnetic disk 90 (FIG. 2). Simultaneously, with displacements of the primary deformable body 46 under effect of force F in the direction toward disk 90, actuator 62 develops a force R that is applied to the auxiliary deformable body 48 and is equal but opposite in direction to force F. Both forces F, R counterbalance each other so that vibrations at post 44 are substantially eliminated. This prevents transfer of vibrations to the lead screw 38 and, therefore significantly hastens the settling time of the fine-positioning system. Thus conditions are created for speeding up the head/disk testing procedure.

Experimental results have demonstrated that the tester of the present invention makes it possible for at least a three to four fold reduction in the settling time as compared to conventional prior art testers.

Figure 6:
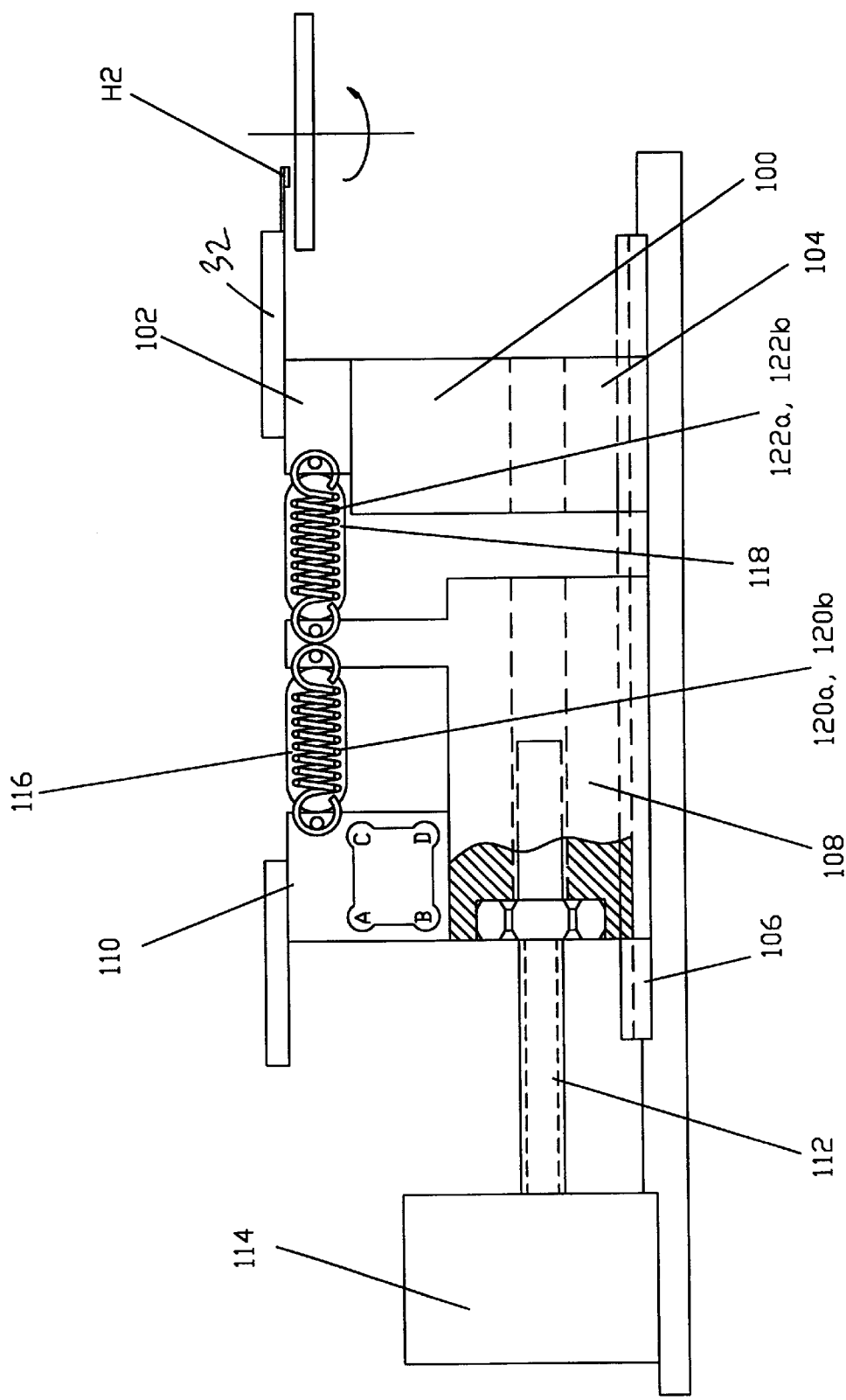
FIG. 6 is a schematic side view of the apparatus made in accordance with an alternative embodiment of the present invention in which a rigid body that supports the head to be tested is installed on a separate slide.

Some disk/head testers, for example a S1 701 tester produced by Guzik Technical Enterprises do not provide enough space for locating both deformable bodies on the same slide. In view of this FIG. 6 illustrates an alternative embodiment of the invention where a to primary body 100, supportive of arm 32 and read/write head H2, and installed on a top plate 102, is mounted on a separate primary slide 104. Primary slide 104 may be guided along the same, or different, guide rails 106 as an auxiliary slide 108 that supports an auxiliary deformable body 110 moveable linearly by a lead screw 112 and driven by a stepper motor 114. Movements of auxiliary slide 108 are transmitted to the primary slide 104 via piezo actuator 118 and springs 122a, 122b in a similar manner as shown in FIG. 5. In FIG. 6, mechanisms for clamping piezo actuators 116, 118 are shown schematically in the form of springs 120a, 120b, 122a, 122b. Structurally, however, they may be the same as in FIG. 5. Since primary body 100 is moved independently on its own slide 104, it preferably comprises a rigid body rather than a deformable body. The remaining structural features and the conditions with regard to the equality of the (stiffness/mass) ratios and (mass×expansion coefficient) products in both systems are preferably the same conditions as described above in the mechanism of the first embodiment. The mechanism of the embodiment of FIG. 6 operates in a manner similar to the one described with reference to FIGS. 2 and 3.

Figure 7:
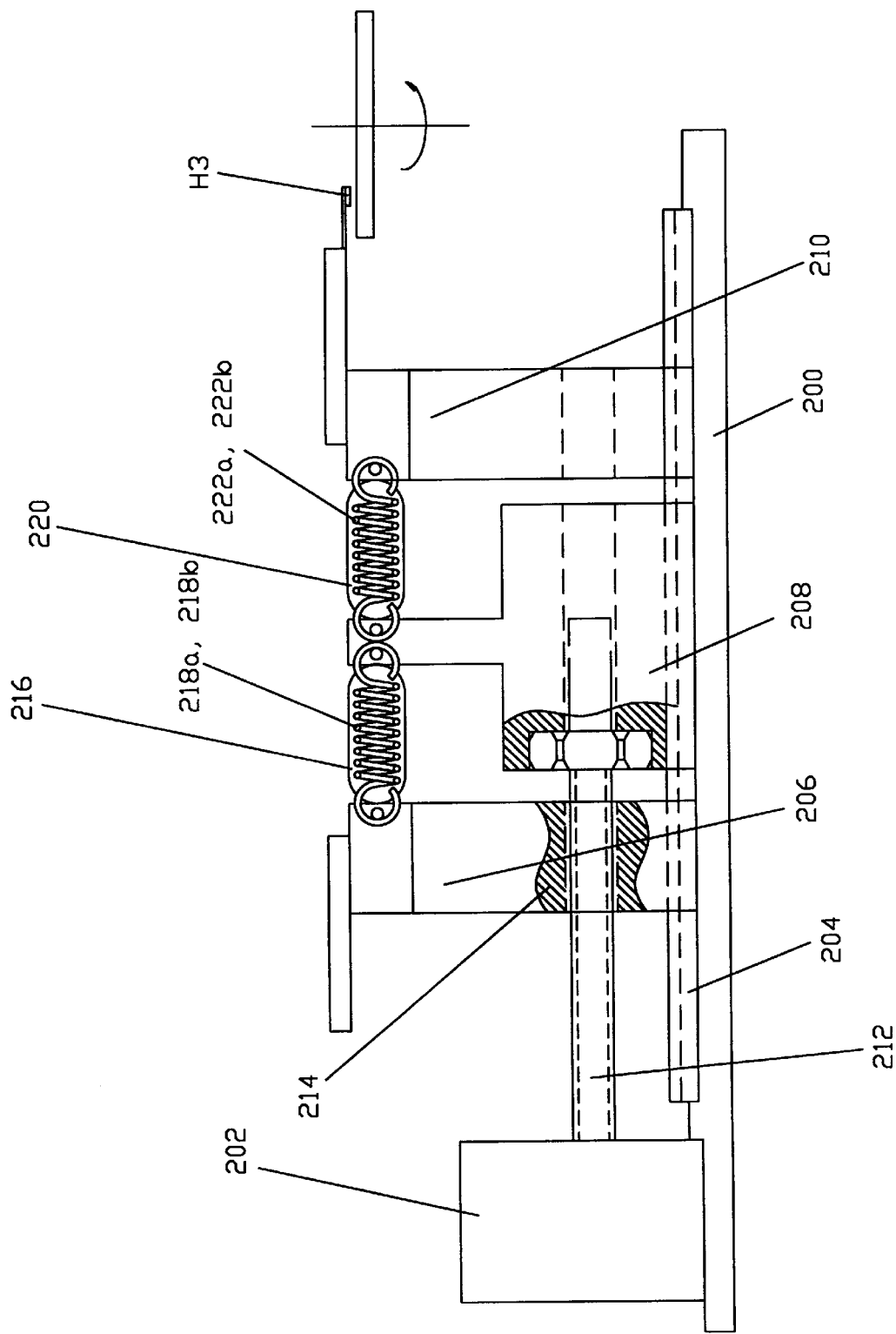
FIG. 7 is a schematic side view of an alternative embodiment of the present invention in which both bodies are rigid and are installed on separate slides.

A second alternative embodiment of the invention is illustrated in FIG. 7. In this embodiment, a base plate 200 rigidly supports a stepper motor 202 and includes guide rails 204 that slidingly support three sequentially arranged slides, i.e., a first slide 206, a second slide 208, and a third slide 210. Second slide 208 is linearly driven along guides 204 by means of a lead screw 212 rotated by stepper motor 202. Lead screw 212 passes through an opening 214 in first slide 206 without engagement therewith.

Connection between first slide 206 and second slide 208 is completed via a piezo actuator 216 prestressed by springs 218a, 218b in the same manner as in the previously described embodiments. Similarly, connection between second slide 208 and third slide 210 is completed via a piezo actuator 220 prestressed by springs 222a, 222b. In this embodiment, slides 206 and 210 are rigid bodies rather than deformable bodies, since microdisplacements are performed with movements along guides 204.

The principle of operation of the system of FIG. 7 is the same as in the previous embodiments. The reaction force from slide 210 that carries magnetic head H3 is counterbalanced by the force developed by the reaction force from slide 206 as they move synchronously in opposite directions.

Figure 8:
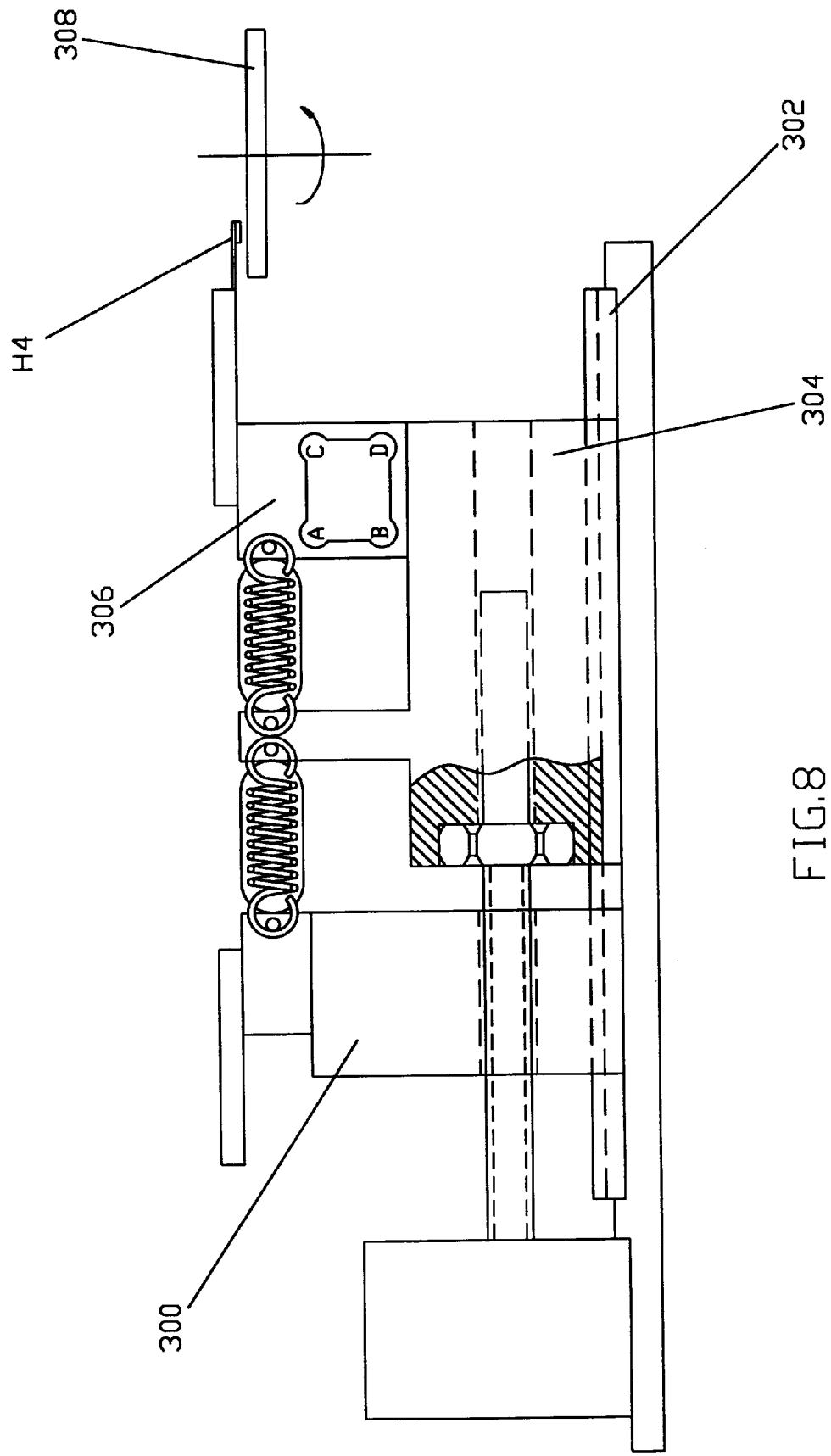
FIG. 8 is a schematic side view of an alternative embodiment of the present invention in which a deformable body that supports the head to be tested is installed on the main slide and the rigid counterbalancing body is installed on a separate slide.

A third alternative embodiment shown in FIG. 8 is similar in operation to that of FIG. 2 with the exception that the second deformable body 48 of FIG. 2 is replaced by a rigid body 300 that is guided along the same guides 302 as primary slide 304 which supports a deformable body 306 that carries a magnetic head H4 displaceable with regard to a magnetic disk 308. The principle of the operation remains the same.

Thus it has been shown that the invention provides an apparatus and a method that improve dynamic characteristics in the fine-positioning mechanism of a spinstand, hasten the magnetic head testing operations, and allow the use of heavy measurement mechanisms without detrimental effect on accuracy and speed of testing.

Because the forces operating on the lead screw are counterbalanced, it becomes possible to equip the tester with heavy measurement instruments such as optical encoders, the weight of which will not impair the speed of measurements.

While this invention has been particularly shown and described with references to preferred embodiments thereof, it will be understood by those skilled in the art that various changes in form and details may be made therein without departing from the spirit and scope of the invention as defined by the appended claims.

For example, although only one read/write head is shown on the primary deformable body for simplicity of the drawings, it is understood that this body may support a plurality of read/write heads. The heads may be attached to both deformable bodies to perform tests in conjunction with, for example, two disks supported by two spindles. The deformable bodies may have configurations and materials different from those described in the application. Piezo actuators can be clamped by bolts screwed into the post rather than into the deformable body. Rough positioning may be performed with a linear servomotor rather than with the lead screw. The slide may be guided in hydrostatic bearings.

We claim:

1. A method for improving dynamic characteristics of a fine-positioning mechanism in a magnetic head/disk tester having a coarse positioning mechanism and a fine-positioning mechanism moveable by said coarse positioning mechanism, including a first body that supports a magnetic head to be tested, a first drive means in contact with said first body, actuation of said first drive means applying to said first body a first force that causes displacement of said first body together with said magnetic head, comprising the steps of:

providing said fine-positioning mechanism with means for generating a second force which is equal to said first force in magnitude and is opposite thereto in direction, said first force and said second force being generated and operating simultaneously;

actuating said first drive means for displacing said first body and thus moving said magnetic head to the fine position required for testing; and counterbalancing a reaction developed as a result of said first force and transmitted to said coarse positioning mechanism by actively generating said second force simultaneously with said first force, said second force being applied to a second body to cause displacement of said second body in a direction substantially opposite said first body.

2. The method of claim 1, wherein means for generating said second force comprises a second drive means, the second body being in contact with said second drive means, actuation of said second drive means applying to said second body said second force that causes displacement of said second body in the direction opposite said first body.

3. The method of claim 2, wherein said first body has a predetermined mass, said first drive means comprise a first actuator that has a predetermined stiffness and a predetermined expansion coefficient, said second body has a predetermined mass, said second drive means comprises a second actuator that has a predetermined stiffness and a predetermined expansion coefficient, a ratio of the stiffness of said first actuator to the mass of said first body is equal to a ratio of the stiffness of said second actuator to the mass of said second body, and a product of the mass of said first body with the expansion coefficient of said first actuator is equal to a product of the mass of said second body with the expansion coefficient of said second actuator.

4. The method of claim 3, further including a step of preloading said first body and said second body to maintain said first body and said second body in contact with said first drive means and with said second drive means, respectively.

5. A magnetic disk and head tester for moving at least one magnetic head across a magnetic disk, said tester comprising:

a base plate with linear guides;

a mechanism for coarse positioning of said magnetic head linearly with respect to said magnetic disk, said mechanism for coarse positioning having drive means supported by said base plate and a first slide moveable along said guides by said drive means, said first slide having a stationary part which is stationary with respect to said first slide; and a fine-positioning mechanism moveable by said coarse positioning mechanism, said fine positioning mechanism comprising:

a first body that supports said magnetic head;

a first drive means in contact with said first body comprising an active element directly responsive to electronic control signals for active positioning thereof with respect to the stationary part;

a second body that is located on the opposite side of said stationary part of said first slide with respect to said first body;

a second drive means in contact with said second body comprising an active element directly responsive to electronic control signals for active positioning thereof with respect to the first body; and means for measuring displacements of said magnetic head.

6. The tester of claim 5, wherein said first body has a predetermined mass, said first drive means comprises a first actuator which has a predetermined stiffness and a predetermined expansion coefficient, said second body has a predetermined mass, said second drive means comprises a second actuator, said second actuator has a predetermined stiffness and a predetermined expansion coefficient, a ratio of the stiffness of said first actuator to the mass of said first body is equal to a ratio of the stiffness of said second actuator to the mass of said second body, and a product of the mass of said first body with the expansion coefficient of said first actuator is equal to a product of the mass of said second body with the expansion coefficient of said second actuator, said first actuator and said second actuator being connected to a source of electric supply in parallel with each other for simultaneous operation.

7. The tester of claim 5, further comprising a first preloading means for preloading said first body to maintain said first body in contact with said first drive means so that actuation of said first drive means applies to said first body a first force that causes displacement of said first body together with said magnetic head, and a second preloading means for preloading said second body to maintain said second body in contact with said second drive means so that actuation of said second drive means applies to said second body a second force which is simultaneous in action and opposite in direction with respect to said first force.

8. The tester of claim 7, wherein said first and said second drive means comprise piezo actuators, and said first and second preloading means each comprises a mechanism with at least one compressed spring located between said stationary part of said first slide and a part moveable with the respective body.

9. The tester of claim 5, wherein said means for measuring said displacement of said at least one magnetic head comprises an optical encoder.

10. The tester of claim 8, wherein said first body and said second body are deformable bodies each made substantially in the form of a parallelepiped in which at least a portion has a stiffness lower than that of the remaining part of said first preloaded deformable body, said first deformable body and said second deformable body having lower sides rigidly attached to said first slide, whereas said part moveable with said respective body is in contact with said respective actuator of said body.

11. The tester of claim 8, wherein said first body is a rigid body that is guided independently along said base plate in the direction parallel to said first slide, said second body is a deformable body that is made substantially in the form of a parallelepiped in which at least a portion has a stiffness lower than that of the remaining part of said first preloaded body, said second deformable body having lower sides rigidly attached to said first slide, whereas said part moveable with said respective body is in contact with said actuator of said second body.

12. The tester of claim 5 wherein said first body and said second body are both rigid bodies that are guided independently along said base plate in the direction parallel to said first slide.

13. The tester of claim 5 wherein said second body is a rigid body that is guided independently along said base plate in the direction parallel to said first slide, and said first body is a deformable body that is made substantially in the form of a parallelepiped in which at least a portion has a stiffness lower than that of the remaining part of said first body, said first deformable body having its lower side rigidly attached to said first slide, whereas said part moveable with said first body is in contact with said actuator of said first body.

14. The tester of claim 5, wherein said stationary part is a rigid post in an intermediate position of said slide.

15. A magnetic head positioner for positioning a magnetic head relative to a magnetic disk comprising:

a guide;

a first slide moveable along said guide;

a first positioner for positioning said first slide along said guide;

a first body including a magnetic head mount adapted for supporting a magnetic head;

a first actuator directly responsive to electronic control signals for positioning said first body relative to said first slide in the direction of said guide;

a second body; and a second actuator directly responsive to the electronic control signals for actively positioning said second body relative to said first slide in a direction substantially opposite said first body.

16. The magnetic head positioner of claim 15 wherein the first positioner provides coarse positioning of said first body along said guide.

17. The magnetic head positioner of claim 15 wherein the first actuator provides fine positioning of said first body along said guide.

18. The magnetic head positioner of claim 15 wherein said second body is positioned with respect to said first slide opposite said first body.

19. The magnetic head positioner of claim 15 wherein said guide is linear.

20. The magnetic head positioner of claim 15 further comprising a controller coupled to the first and second actuators effective for generating the control signals to position the first and second bodies.

21. The magnetic head positioner of claim 15 wherein said first actuator applies a first force coupled to said first body and wherein said second actuator applies a second force coupled to said second body.

22. The magnetic head positioner of claim 15 wherein said first and second bodies have a predetermined first and second mass respectively, and wherein said first and second actuators have a predetermined first and second stiffness respectively; the ratio of the stiffness of said first actuator to the mass of the first body being substantially equal to the ratio of the stiffness of said second body to the mass of the second body.

23. The magnetic head positioner of claim 15 wherein said first and second bodies have a predetermined first and second mass respectively, and wherein said first and second actuators have predetermined expansion coefficients; the product of the mass of said first body with the expansion coefficient of the first actuator being substantially equal to the product of the mass of the second body with the expansion coefficient of the second actuator.

24. The magnetic head positioner of claim 15 wherein said first body and second body are deformable bodies, each in the form of a parallelepiped.

25. The magnetic head positioner of claim 24 wherein at least one of said first and second deformable bodies is rigidly coupled to said first slide.

26. The magnetic head positioner of claim 15 further comprising a second slide and wherein one of the first and second bodies is mounted to the first slide and the other is mounted to the second slide; said second slide moveable in the direction of said guide.

27. The magnetic head positioner of claim 26 wherein the second slide is moveable along said guide.

28. The magnetic head positioned of claim 15 wherein the first and second bodies are rigid bodies guided independently along said guide.

29. The magnetic head positioner of claim 15 wherein said first and second actuators comprise piezoelectric actuators which vary in linear dimension in response to the applied control signals.

* * * * *